(12) United States Patent
Schweizer

(10) Patent No.: US 7,611,198 B2
(45) Date of Patent: Nov. 3, 2009

(54) SEAT WITH A MOUNTING OPTION FOR A MONITOR AND/OR CONTROL UNIT, SUCH A UNIT AND ITS USE, AND A SYSTEM COMPRISING SUCH A SEAT AND SUCH A UNIT

(75) Inventor: Oliver Schweizer, Lindenberg (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 284 days.

(21) Appl. No.: 11/348,501

(22) Filed: Feb. 7, 2006

(65) Prior Publication Data
US 2006/0175882 A1   Aug. 10, 2006

(30) Foreign Application Priority Data
Feb. 8, 2005   (DE) .................. 10 2005 005 654

(51) Int. Cl.
*B60N 3/00* (2006.01)
(52) U.S. Cl. ................ 297/217.3; 297/146; 297/188.07
(58) Field of Classification Search ................ 297/146, 297/188.04, 188.06, 188.07, 217.3
See application file for complete search history.

(56) References Cited

U.S. PATENT DOCUMENTS

| | | | | |
|---|---|---|---|---|
| 3,795,422 A | * | 3/1974 | Robinson et al. ............ 297/146 |
| 5,529,265 A | | 6/1996 | Sakurai | |
| 5,640,297 A | * | 6/1997 | Labaze ........................ 361/683 |
| 5,720,515 A | * | 2/1998 | Haffner .................. 297/188.04 |
| 5,813,354 A | * | 9/1998 | Scott ........................... 297/146 |
| 6,059,358 A | * | 5/2000 | Demick et al. ......... 297/188.04 |
| 6,702,375 B1 | * | 3/2004 | Laskowski et al. ..... 297/188.07 |
| 2004/0183346 A1 | * | 9/2004 | Sanford et al. ........... 297/217.3 |
| 2005/0110310 A1 | * | 5/2005 | Mayer et al. ........... 297/188.06 |
| 2005/0200697 A1 | * | 9/2005 | Schedivy et al. .............. 348/61 |
| 2005/0204596 A1 | * | 9/2005 | Peng ..................... 297/188.04 |
| 2005/0206206 A1 | * | 9/2005 | Peng ........................ 297/217.3 |

FOREIGN PATENT DOCUMENTS

| | | |
|---|---|---|
| DE | 43 40 189 | 6/1995 |
| DE | 197 08 764 | 11/1997 |
| DE | 100 29 624 | 1/2002 |
| DE | 201 19 410 | 10/2002 |
| DE | 103 33 912 | 2/2005 |
| FR | 2 855 472 | 12/2004 |

* cited by examiner

*Primary Examiner*—Peter R. Brown
(74) *Attorney, Agent, or Firm*—Posz Law Group, PLC

(57) ABSTRACT

An aircraft passenger seat (10) having at least one seat component and a backrest structure (16). The backrest structure (16) has in its rear area a mounting option (18) for an electronic device (30,20). A retaining device (22) on the backrest structure (16) is adapted to retain the electronic device (30, 20) while permitting the electronic device (30,20) to be removed for transportation to another location. Connections (40) can be formed in the retaining device (22) for connecting to corresponding connections, or plugs (42), on the electronic device (30,20) for connecting the electronic device (30,20) to a data network or a power supply.

18 Claims, 2 Drawing Sheets

Figure 1:
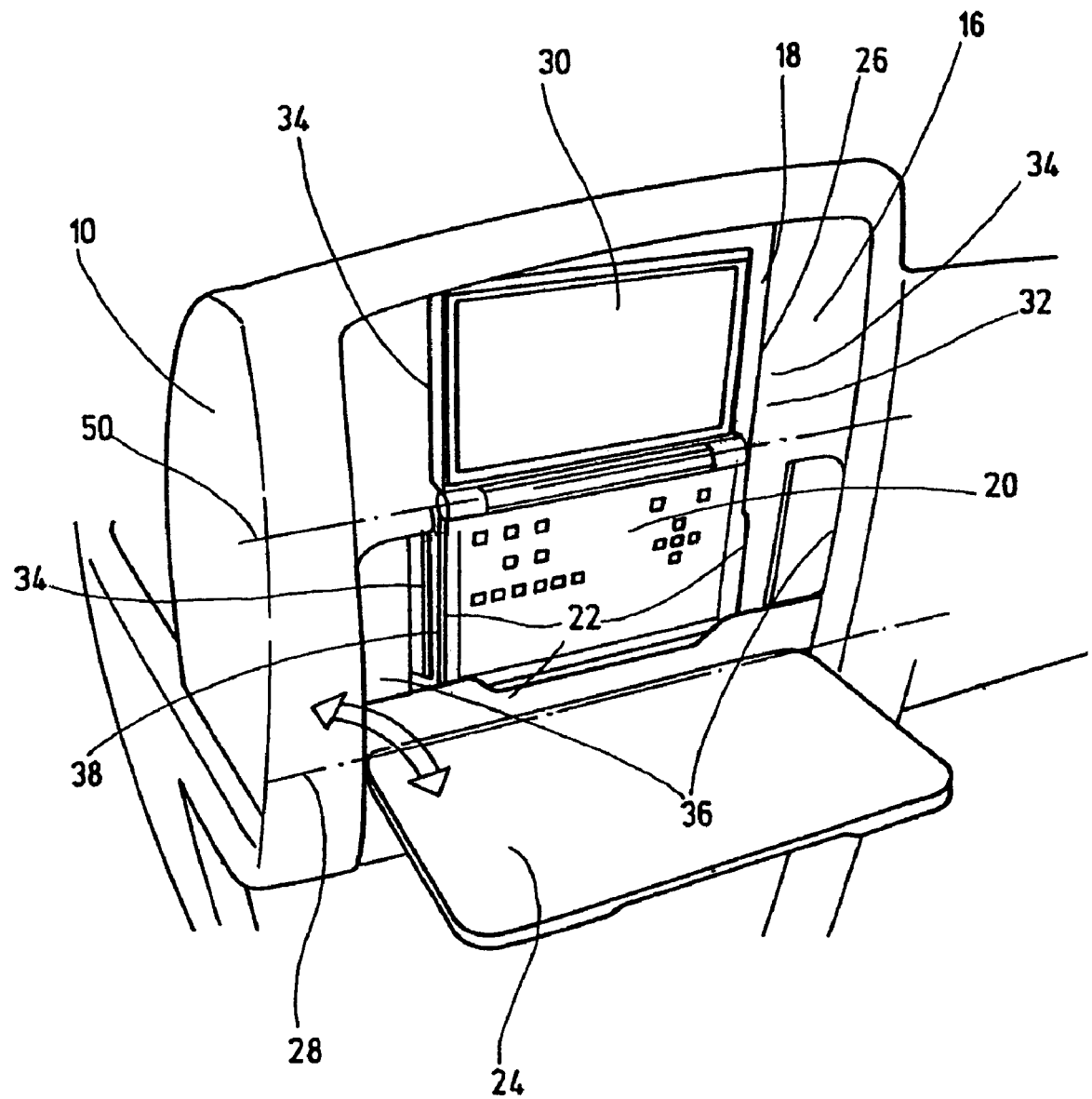

SEAT WITH A MOUNTING OPTION FOR A MONITOR AND/OR CONTROL UNIT, SUCH A UNIT AND ITS USE, AND A SYSTEM COMPRISING SUCH A SEAT AND SUCH A UNIT

The invention relates to a seat, an aircraft passenger seat in particular, having at least one seat component and a backrest structure in the form of a backrest or of a shell structure at least partly enclosing the backrest, which structure has in its rear area a mounting option for a monitor and/or control unit.

Such seats, aircraft passenger seats in particular, are readily available on the market and accordingly in use, in a plurality of embodiments. For example, DE-A-103 33 912 discloses a seat design conceived as an aircraft passenger seat, one in which a monitor with a box-like frame element is integrated into the upper area of a backrest structure in the form of an adjustable-tilt backrest. The monitor may be used to display information to a seat occupant in the row behind, including information in the form of videos or feature films. In view of the additional costs and for weight saving considerations as well such monitor applications are usually to be found in the backrest area only for seats in the first-class and business-class areas. Because of the stationary mounting of the monitor on the backrest, the seat occupant to the rear is forced to assume a fixed posture, especially in the event of prolonged viewing, in order to be able to see the screen display well, and this is a disadvantage of the respective disclosed solutions as well.

It is true that mounting of a monitor with frame element as monitor enclosure in the intervening space between two adjacent passenger seats, a control unit for the monitor unit being integrated into the pivot mounting for the monitor unit, among other things one for operation of the monitor unit, has already been proposed in U.S. Pat. No. 6,758,521 in order to eliminate this disadvantage. However, this monitor and control unit as well falls short as regards the comfort desired. In addition, use from the viewpoint of provision and presentation of information content by the monitor unit is not subject to individual configuration as a result of use of the monitor unit by several users.

In addition, so-called entertainment systems are in use under the patented trade name PEA (personal entertainment appliance), inside aircraft cabins in particular. As portable notebooks they are concentrated with other notebooks in a central storage unit from which a given notebook having a monitor and control unit may be presented by the flight personnel to a particular passenger if he is interested in using it later at his seat. This storage unit may be located so as to be stationary inside the aircraft cabin, in the entrance area, for example, or in a cart which may be moved about so that a PEA unit may be delivered to a passenger in a particular seat.

The storage units are normally provided with a data transmission system (connection data loader) making it possible to transmit information content originating in the internet to the memory of the PEA notebook, including such in the form of feature films, computer games, procedural instructions for operation in flight, etc. Progressive solutions also permit readout of PEA notebook data to the data transmission unit, which accordingly permits sending of data by way of the internet as required. The disclosed PEA monitor and control unit are placed for operation by the user on his lap or on a table unit mounted in the rear area of the backrest structure such as the customary tilting backrest or are available for removal from a storage receptacle in the area of the arm rest of a seat. When the PEA monitor and control unit are not in use but in the way, such as when eating, reading of a magazine, or when the passenger assumes the reclining position, often with the result that the PEA equipment in question is returned to storage by the aircraft personnel and taken from storage when required, something which results in corresponding consumption of personnel time. During operation of an aircraft, there may be instances of the flight being rough due to turbulence, for example, so that monitor and control units situated in various locations on the aircraft may cause a hazard. In addition, the short distance between monitor unit and viewer may be found to be unpleasant during watching of feature films and videos, for example, if the equipment is deposited on the table unit.

On the basis of this prior art the object of the invention accordingly is further to improve the disclosed solutions in order to make use of them easier and save time for aircraft personnel, and at the same time to increase safety of use. The object as thus formulated is attained by means of a seat having the characteristics specified in patent claim 1 and a monitor and/or control unit having the characteristics specified in claim 14 and applied for use as specified in claim 15 and a system as specified in claim 16.

In that, as specified in the characterizing part of claim 1, the respective unit may be fastened by means of a retaining device as a mounting option on the backrest structure and may be removed for delivery to another location, the possibility exists of storing the unit in question, especially one in the form of a PEA notebook, safely on a given seat, by fastening the unit by way of a retaining device on the backrest structure as specified. When the space has been cleared the monitor and/or control unit is no longer in the way either of eating or studying printed materials such as newspapers, or assumption of the reclining position by the seat occupant. The seat occupant is also free to take the monitor and/or control unit with him and use it. Such is not the case otherwise, if the respective unit disclosed in the prior art is rigidly connected to the backrest structure.

On the basis of the mounting option indicated, with retaining device on the backrest structure, the user is also enabled to take the equipment from the mounting option in order to deposit it on the table unit of a seat, for example, something which may facilitate input of data by way of a keyboard, and at least a monitor unit of the appliance may be returned to the mounting option with the retaining device during viewing of a feature film or a video in order to permit so to speak stationary viewing of the screen. In the event of turbulent travel or flight operation the retaining device permits safe storage of the equipment in the mounting option of the backrest structure, so that there need be no worry with respect to possible injuries caused by loose equipment parts.

As has been disclosed in the prior art, the unit in question may be moved to another location for storage or for use outside the vehicle or aircraft, and stored or deposited there if not used or used for data transfer. Since the mounting option on the seat is determined essentially by the configuration of the retaining device, a reliable fastening option may be obtained with low design cost and saving of weight. The indicated backrest structure includes not only backrests which are mounted to be stationary or adjoin a seat component with adjustable tilt but also structures in which a backrest, as is meanwhile customary in the first-class and business-class area, is enclosed in a shell element which assures the seat occupant of an area of privacy separating him from others. In this instance the monitor and/or control unit is positioned in the diagram of the frame on the rear side of the shell element.

As regards the configuration of features specified in claim 14, the monitor and/or control unit has, for use at a seat as specified in claim 1, on its side facing the retaining device, interface elements which may be connected by means of connections of the retaining device to a network, a data and/or power supply network in particular. Such connections may preferably also ensure so-called wireless data transmission (WLAN). Monitor and/or control units outfitted with wi-fi (wireless fidelity) hardware, for example, may at the option of the user execute wireless logon to and use a WLAN (such as a network complying with the IEEE 801.11 Standard). Connections such as these, which may also be present inside the monitor and/or control unit, may be used among other things for communication with a so-called Local Area Network (LAN), but may also be used, for example, for transmission of current flight and weather data during flight.

By preference the monitor unit and the control unit are combined in a notebook, the monitor unit and the processing being mounted to be pivotable relative to each other and preferably also reversibly separable from each other. In the event of removal of the notebook during flight from the retaining device referred to and depositing of the notebook on a table unit, this permits optimal adjustment of the monitor viewing angle for the viewer, the monitor viewing angle being appropriately variable. Consequently, the notebook (PEA) may be safely transported back and forth in the folded state between a storage area and the viewing location at the seat.

Use of a monitor and/or control unit is specified in claim 15. By preference provision is also made, as specified in claim 16, for formation of a system comprising a seat as specified in claim 1 and a monitor and/or control unit as specified in claim 14.

Other advantageous embodiments of the solution claimed for the invention are specified in the dependent claims.

Figure 2:
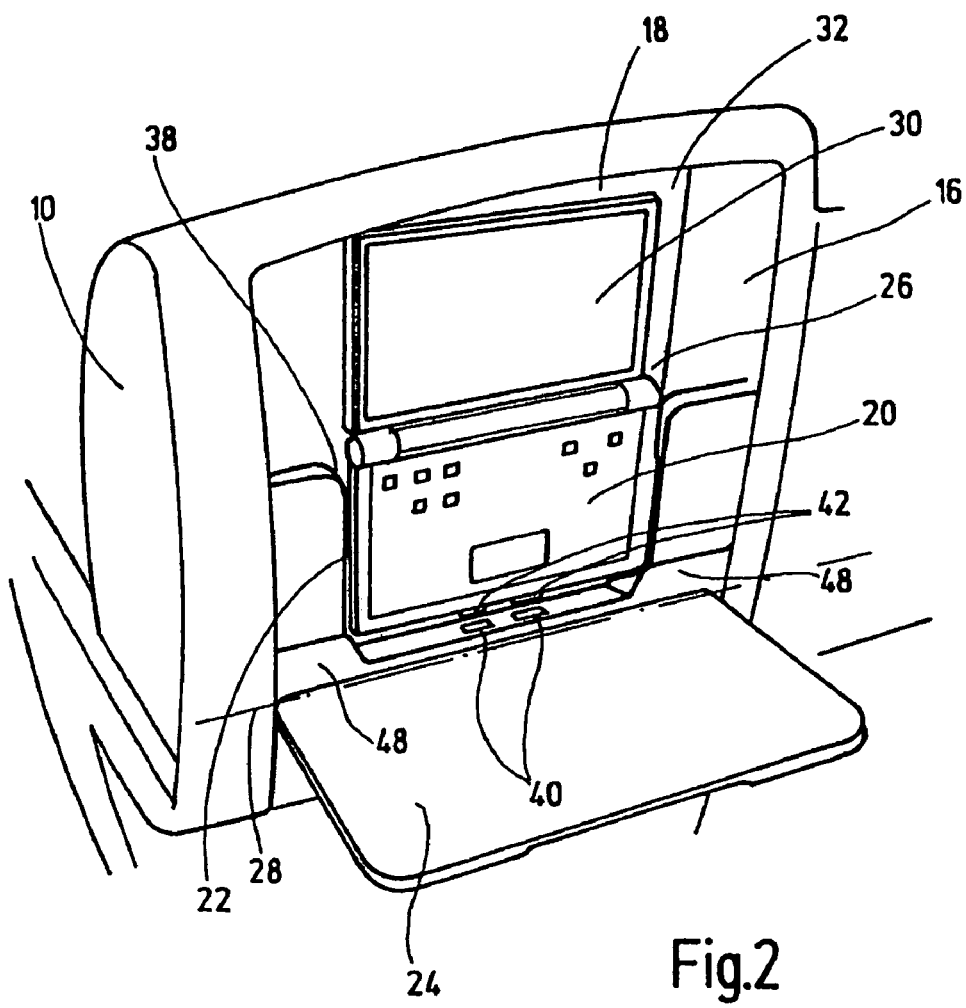
Figure 3:
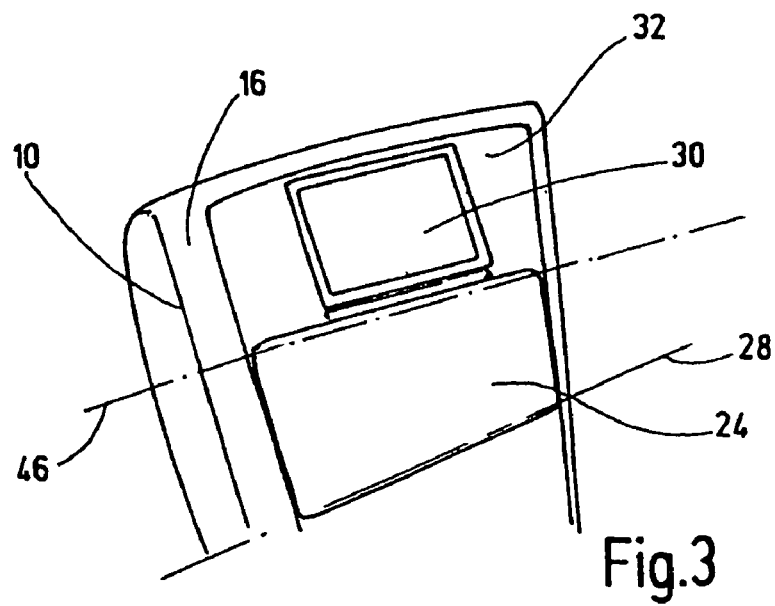

The solution claimed for the invention is described in detail in what follows with reference to the drawing, in which FIG. 1 presents a perspective view of the upper part of the rear area of a backrest structure for an aircraft passenger seat with a monitor and control unit introduced into a mounting option;

FIG. 2 an illustration corresponding to that of FIG. 1 showing the monitor and control unit after partial mounting;

FIG. 3 an illustration corresponding to those of FIGS. 1 and 2 with the table element folded up to cover the control unit with the monitor unit left free.

FIG. 1 presents a perspective view of the upper part of the rear area of a backrest structure 16 for an aircraft passenger seat 10. The embodiment shown is that of a backrest structure 16 with a shell element at least partly enclosing the backrest. The aircraft passenger seat 10 illustrated has in the rear area of the backrest structure 16 a mounting option 18 for a monitor and/or control unit 30, 20. In FIG. 1 a monitor and/or control unit such as this is shown to be present inside the mounting option 18. A table unit 24 pivotable about a pivot axis 28 is shown in its folded-down position and accordingly permits both operation of the control unit 20 and viewing of the monitor unit 30 and at the same time offers the possibility of use of the table unit 24 for reading, writing, eating, and for other purposes. In this instance the monitor and/or control unit 30, 20, are retained in a retaining device 22 mounted in the mounting option 18. For the purpose of cost-effective manufacture of large numbers of the backrest structure 16 configured as a shell element in the embodiment illustrated, the indicated retaining device 22 may be in the form of a frame element (not shown) which may be introduced into and removed from the recess 18 of the backrest structure 16. Such a frame element may be adapted to the particular monitor and/or control unit 30, 20 selected and introduced into a recess 18 of the backrest structure 16 of standard configuration. A retaining device 22 such as this may then be optimally adapted to the respective units 30, 20 which have been introduced.

Such retaining devices 22 may also be configured with geometric dimensions adaptable at least within certain limits so that units 30, 20 made by different manufacturers or with slightly different dimensions may nevertheless be retained in the same retaining device 22. Such adaptability is also desirable for the reason that it represents further improvement in comfort for users of units 30, 20 if they are afforded the possibility of introducing notebooks or PEA equipment they have brought with them, that is, external equipment, into suitable retaining devices 22. Thus, it is an advantage to business travelers, along with the advantages of the solution claimed for the invention, to have their own notebook available to them for working on possibly even confidential data aboard an aircraft.

The mounting option 18 is in the exemplary embodiment configured as storage space 26 which is in the form of a recess 32 in the backrest structure 16. Consequently, no additional structural space is required, so that the comfort of passengers is not restricted in comparison to a seat without the solution claimed for the invention. The geometric extent selected for the recess 32 is such that the limiting walls 34 of the recess at least in part enclose the external outline of the respective unit 30, 20 to a specified extent.

The monitor and/or control unit 30, 20 may be pivoted in relation to each other about a pivot axis 50. This makes possible optimal adjustment of the viewing angle of the monitor unit 30, in particular during use of a notebook with a monitor and/or control unit 30, 20 positioned on the legs of the seat occupant or on the folded-down table unit 24.

As a variation of the retaining device 22 shown in FIG. 1, which in this instance is an integral component of the storage space 26, nonstationary retaining devices 22, pivot units in particular, permitting on-demand positioning of monitor and/or control unit 30, 20 introduced into the retaining device 22 are also possible. It is advantageous both for the last-named embodiment of the retaining device 22 and for its stationary mounting on or in the backrest structure 18 to configure at least parts of the guides 38 of the retaining device 22 to be pivotable, so that the guides of the retaining device 22 may be pivoted toward the person operating the respective unit 30, 20 for the purpose of introduction and removal of the unit and so that the retaining device 22 may be pivoted away again from the person operating for the purpose of stationary mounting of the respective unit. A solution in the form of a sliding tray (not shown) would also be conceivable; the respective unit 30, 20 could be moved by telescoping guides away from the backrest structure 16 toward the seat occupant and in the opposite direction.

For example, the backrest structure 16 has on both sides of the control unit 20 additional storage spaces 36 which may be at least in part covered by a folded-up table unit 24. Such storage spaces may be used, for example, for placing down eyeglasses, for holding equipment supplementing the monitor and/or control unit 30, 20, equipment such as headphones, a computer mouse, or other input devices. Unintentional falling of items introduced into the other storage spaces 36 can be effectively prevented by suitable holding devices for immobilizing the items in the other storage spaces 36 and/or by a trough-like configuration in the bottom area of the other storage spaces 36.

FIG. 2 presents an illustration corresponding to that of FIG. 1 with monitor and/or control unit 30, 20 partly introduced; the table unit 24 is in turn shown in the folded-down position. Introduction of the monitor and/or control unit 30, 20 only part of the way in FIG. 2 allows viewing of the connections 40 of the retaining device 22. Interface elements 42 corresponding to the connections 40 are positioned on the monitor and/or control unit 30,20 shown in FIG. 2 as PEA equipment. When this monitor and/or control unit 30, 20 has been fully introduced, these interface elements 42 permit connection of the unit 30, 20 to the connections 40 of the retaining device 22.

The retaining device 22 has additional guides 48 which delimit the storage space 26 in the direction of the recess 32. After the monitor and/or control unit 30, 20 has been fully introduced into the retaining device 22, tipping out of the monitor and/or control unit 30/20 is effectively prevented by the additional guides 48 configured as retaining catches in FIG. 2. In addition, establishment of a connection between the connections 40 of the retaining device 22 during introduction of the unit shortly before completion of the introduction process by the additional guides may be effected with such high precision that reliable contact may be obtained between contact plugs of the connections 40 and corresponding contact plugs of the interface elements 42, but with little wear. In that, in the process of introduction from the direction of the upper side of the backrest structure 16 the contacts first move through the funnel-shaped configuration of part of the guides 38 of the retaining device 22, as is shown in FIG. 2 by the example of a guide 38 with a radial element situated there on the left edge of the control unit 20, ease of introduction of the unit is possible even under cramped conditions.

The connections 40 serve the purpose of connection of the respective unit 30, 20 to a network, a data network and/or power supply network in particular.

Units 30, 20 which do not have a rechargeable energy reservoir for power supply may be provided with current by way of the power supply network, which may optionally be connected to the unit 30, 20 by way of the connections 42 indicated in the foregoing.

Units 30, 20 which have a rechargeable energy reservoir may be operated in so-called charge maintenance operation, in which the rechargeable energy reservoir is charged and its content then replenished after self-discharge. Such units 30, 20 are operated by a power supply which may be connected by way of the connections 42 but they may optionally be taken by the user temporarily from the retaining device 22 and operated on the table unit 24 or the legs of the seat occupant.

FIG. 3 illustrates a diagram corresponding to that of FIGS. 1 and 2 with folded-up table unit 24 for covering the control unit while the monitor 30 unit is left free. When the storage space 32 is only partly covered by the folded table unit 24, the monitor unit 30 may continue to be viewed by the user. This offers the advantage that users receive important information from the flight personnel, such as information concerning buckling the seat belt during the takeoff or landing process, despite the fact that the table unit 24 has been folded up.

As a result of only partial covering of the storage space 32 by the folded-up table unit 24 the monitor unit 30, which is approximately at the level of the user=s head, remains uncovered. This may present increased danger in the event of collision of a person with this area of the backrest structure 16, whether unintentionally or as the result of an accident. FIG. 3 accordingly shows an additional pivot axis 46 about which the table unit 24 may be unfolded in another embodiment of the invention (not shown) and when the table unit 24 is configured to be a table plate consisting of two halves so that after folding up of the table unit 24 in this configuration into the position shown in FIG. 3 about the pivot axis 28 another process of pivoting of the second half of the table plate about the other pivot axis 46 is possible. This additional pivoting process, as a result of pivoting up of the plate-like table unit 24 about the other pivot axis 46, leads to complete covering of the recess 32, so that no increased danger to passengers is caused by introduction of a monitor unit 30 into the recess 32.

Depending on the space relationships the table unit 24 may also be configured to be in one piece so that when it has been folded up it covers the monitor and control unit 30, 20 and offers effective protection from injuries in the event of a crash.

Suitable configuration of the recess 32 also makes it possible to introduce the table unit 24 in its entirety into the recess 32 so that a smooth backrest structure 16 surface is obtained without any raised areas when the table unit 24 has been folded up, with no edges or other transitional areas. This represents a hazard reduction especially in the case of a table unit 24 covering the monitor and control unit 30, 20.

Although PEA equipment is shown as monitor and control unit 30, 20 in the configuration illustrated, use of notebooks, PDAs, or other portable entertainment or information electronics equipment is also possible. It is also possible to configure the control unit 20 to be separable from the monitor unit 30, and accordingly to use a control unit 20 alternatively with different monitor units 30, as well as to use a monitor unit 30 alternatively with different control units 20.

Even if a table unit 24 in one part or optionally two parts is provided on the backrest structure 16 in the embodiment illustrated, the solution claimed for the invention is not restricted to seats with a table unit 24. The solution claimed for the invention may be applied to the fullest extent in particular with backrest structures 16 having no table unit 24.

Application of the solution claimed for the invention is not restricted to aircraft passenger seats 10. It may also be applied in any vehicles or even in larger auditoriums. The notebook systems which may be introduced into the backrest may also be designed as so-called tablet PCs and the screen accordingly as a one-part display panel.

The invention claimed is:

1. A seat system comprising:
an electronic device having a control unit for input of information by a seat occupant and a display unit; and
a seat, wherein the seat includes:
a seat component;
a backrest adjoining the seat component, wherein the backrest has at least an upright position;
a recess located on a rear side of the backrest, wherein the backrest has wall parts defining a storage space within the recess; and
a retaining device for retaining the electronic device in a retained position in the storage space in the upright position of the backrest, wherein the retaining device includes a guide, which is adapted to guide the electronic device into the retained position; wherein
the storage space defined by said wall parts has a first region and a second region, which are spaced apart from each other with respect to a vertical direction defined relative to a floor, on which the seat is adapted to be mounted;
the retaining device has retaining parts arranged in the first region and provided for retaining the control unit;
the second region of the storage space is provided for receiving the display unit;
the retaining device removably retains the electronic device in the recess such that the electronic device may be removed from the recess at the option of the seat occupant; and
the storage space is open rearwardly when the electronic device is in the retained position in the upright position of the backrest, such that the seat occupant has visual access to the display unit, wherein the electronic device includes a pivotal unit by which the display unit pivots relative to the control unit between a closed position, in which the display unit overlies the control unit, and an open position, and the control unit is retained in the first region of the storage space while the display unit is pivoted to the second region and maintained in the open position for use by the seat occupant.

2. The system according to claim 1, wherein the geometric extent of the retaining device is selected such that limiting walls of the retaining device are adapted to enclose a housing of the electronic device in the retained position at a distance from the electronic device to retain the electronic device in the retained position.

3. The system according to claim 1, wherein the retaining device forms at least one limiting wall that forms the guide, wherein the limiting wall is adapted to extend along edge parts of the housing of the electronic device, when the electronic device is in the retained position.

4. The system according to claim 3, wherein the retaining device has additional guide parts, which are retaining catches at a bottom of the storage space for preventing the electronic device from escaping from the retaining device after the electronic device has been fully placed in the retaining device.

5. The system according to claim 3, wherein additional storage spaces are introduced into the limiting walls of the retaining device.

6. The system according to claim 1, wherein the backrest has a table unit, which may be folded up and which, when in the folded-up position, is adapted to cover the control unit without obstructing the display unit.

7. The system according to claim 6, wherein the table unit, when folded up, is at least in part flush with areas of the backrest.

8. The system according to claim 1, wherein the retaining device has connections for connection of the electronic device to a data network or a power supply.

9. The system according to claim 8, wherein the connections are placed in the recess and are adapted to interact with corresponding connections of the electronic device, which are arranged at an edge of the electronic device.

10. The system according to claim 8, wherein the connections are situated, relative to the vertical direction, at the bottom of the storage space.

11. The system according to claim 1, wherein the seat is an aircraft passenger seat.

12. The system according to claim 1, wherein the seat further includes a backrest structure, and the backrest structure is a shell element at least partly enclosing the backrest.

13. The system according to claim 1, wherein, relative to the vertical direction the first region, which is provided for receiving the control unit, is in the lower half of the storage space, and the second region, which is provided for receiving the display unit, is in the upper half of the storage space.

14. The system according to claim 1, wherein the electronic device is embodied as a notebook computer.

15. The system according to claim 1, wherein the guide interacts with edges of the electronic device.

16. The system according to claim 1, wherein the guide interacts with edges of the control unit.

17. The system according to claim 1, wherein in the second region free space is provided in the vicinity of an edge of the display unit for the seat occupant to grip the edge of the display unit in the retained position of the electronic device.

18. The system according to claim 1, wherein the guide is arranged in the first region of the storage space.

\* \* \* \* \*